(12) United States Patent
Wu et al.

(10) Patent No.: US 10,715,813 B2
(45) Date of Patent: Jul. 14, 2020

(54) METHOD AND APPARATUS FOR PERFORMING BLOCK PREDICTION SEARCH BASED ON RESTORED SAMPLE VALUES DERIVED FROM STORED SAMPLE VALUES IN DATA BUFFER

(71) Applicant: MEDIATEK INC., Hsin-Chu (TW)

(72) Inventors: Tung-Hsing Wu, Chiayi (TW); Kun-Bin Lee, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 724 days.

(21) Appl. No.: 14/534,184

(22) Filed: Nov. 6, 2014

(65) Prior Publication Data

US 2015/0139311 A1 May 21, 2015

Related U.S. Application Data

(60) Provisional application No. 61/904,490, filed on Nov. 15, 2013.

(51) Int. Cl.
*H04N 19/14* (2014.01)
*H04N 19/15* (2014.01)
*H04N 19/105* (2014.01)
*H04N 19/159* (2014.01)
*H04N 19/593* (2014.01)
*H04N 19/423* (2014.01)
(Continued)

(52) U.S. Cl.
CPC .......... *H04N 19/14* (2014.11); *H04N 19/105* (2014.11); *H04N 19/159* (2014.11); *H04N 19/176* (2014.11); *H04N 19/423* (2014.11); *H04N 19/50* (2014.11); *H04N 19/593* (2014.11)

(58) Field of Classification Search
None
See application file for complete search history.

(56) References Cited

U.S. PATENT DOCUMENTS

2004/0109503 A1* 6/2004 Lee ................ H04N 5/145
375/240.16
2006/0023794 A1* 2/2006 Wan ................ H04N 5/142
375/240.29
(Continued)

FOREIGN PATENT DOCUMENTS

CN 102148996 A 8/2011

OTHER PUBLICATIONS

"International Search Report" dated Feb. 15, 2015 for International application No. PCT/CN2014/090991, International filing date: Nov. 13, 2014.
(Continued)

*Primary Examiner* — Mikhail Itskovich
(74) *Attorney, Agent, or Firm* — Winston Hsu

(57) ABSTRACT

A block prediction search method includes at least following steps: utilizing a data buffer to store bit-depth reduced sample values of a plurality of samples in a first pixel line; detecting occurrence of an edge in the first pixel line according to restored sample values derived from stored sample values in the data buffer; and determining a block prediction vector for a pixel group in a second pixel line different from the first pixel line, wherein the block prediction vector is determined based at least partly on a last edge count value indicative of a number of samples in the first pixel line that have gone by since the edge occurs.

16 Claims, 4 Drawing Sheets

(51) Int. Cl.
*H04N 19/176* (2014.01)
*H04N 19/50* (2014.01)

(56) References Cited

U.S. PATENT DOCUMENTS

| | | | |
|---|---|---|---|
| 2006/0126726 A1* | 6/2006 | Lin | H04N 19/172 375/240.03 |
| 2006/0188024 A1 | 8/2006 | Suzuki | |
| 2007/0274398 A1 | 11/2007 | Caulk | |
| 2011/0026599 A1 | 2/2011 | Andersson | |

OTHER PUBLICATIONS

Dzung Hoang, Unified scaling with adaptive offset for reference frame compression, Joint Collaborative Team on Video Coding(JCT-VC) of ITU-T SG16 WP3 and ISO/IEC JTC1/SC29/WG11, 6th Meeting, Jul. 14-22, 2011, pp. 1-19, JCTVC-F075, XP030049051, Torino, IT.

Takeshi Chujoh et al., Internal bit depth increase except frame memory, ITU-Telecommunications Standardization Sector, Study Group 16 Question 6, Video Coding Experts Group (VCEG), 32nd Meeting, Apr. 20-21, 2007, pp. 1-4, VCEG-AF07, XP030003528, San Jose, USA.

Takeshi Chujoh et al., TE2: Adaptive scaling for bit depth compression on IBDI, Joint Collaborative Team on Video Coding (JCT-VC) of ITU-T SG16 WP3 and ISO/IEC JTC1/SC29/WG11, 2nd Meeting, Jul. 21-28, 2010, pp. 1-4, JCTVC-B044, XP030007624, Geneva, CH.

Takeshi Chujoh et al., Description of video coding technology proposal by Toshiba, Joint Collaborative Team on Video Coding (JCT-VC) of ITU-T SG16 WP3 and ISO/IEC JTC1/SC29/WG11, 1st Meeting, Apr. 15-23, 2010, pp. 1-38, JCTVC-A117r1, XP030007559, Dresden, DE.

Takeshi Chujoh et al., Adaptive scaling for bit depth compression on IBDI, Joint Collaborative Team on Video Coding (JCT-VC) of ITU-T SG16 WP3 and ISO/IEC JTC1/SC29/WG11, 4th Meeting, Jan. 20-28, 2011, pp. 1-7, JCTVC-D152r1, XP030047473, Daegu, KR.

Huiming Huang et al., Efficient Intra Prediction Based on Line With Adaptive Gradient Detection for High Definition Videos, Proceeding of IC-NIDC2012, 2012 3rd IEEE International Conference, IEEE, Sep. 21, 2012, pp. 406-410, XP032314607.

Xiulian Peng et al., Line-based Image Coding using Adaptive Prediction Filters, IEEE International Symposium on Circuits and Systems, ISCAS 2010, May 30-Jun. 2, 2010, pp. 4221-4224, XP031724805.

Changcai Lai et al., One Dimensional Prediction and Transform for Intra Coding, 2011 18th IEEE International Conference on Image Processing, 2011 IEEE, Sep. 11, 2011, pp. 3485-3488, XP032080446.

VESA Display Stream Compression (DSC) Standard, Version 1.1, 2014 Video Electronics standards Association, Aug. 1, 2014, pp. 1-125, XP030001644.

* cited by examiner

METHOD AND APPARATUS FOR PERFORMING BLOCK PREDICTION SEARCH BASED ON RESTORED SAMPLE VALUES DERIVED FROM STORED SAMPLE VALUES IN DATA BUFFER

CROSS REFERENCE TO RELATED APPLICATIONS

This application claims the benefit of U.S. provisional application No. 61/904,490, filed on Nov. 15, 2013 and incorporated herein by reference.

BACKGROUND

The disclosed embodiments of the present invention relate to data compression and decompression, and more particularly, to a method and apparatus for performing block prediction search based on restored sample values derived from stored sample values in a data buffer.

A display interface may be disposed between an application processor (AP) and a driver integrated circuit (IC) to transmit display data from the AP to the driver IC for further processing. When a display panel supports a higher display resolution, 2D/3D display with higher resolution can be realized. Hence, the display data transmitted over the display interface would have a larger data size/data rate, which increases the power consumption of the display interface inevitably. If the AP and the driver IC are both located at a portable device (e.g., a smartphone) powered by a battery device, the battery life is shortened due to the increased power consumption of the display interface.

Similarly, a camera interface may be disposed between a camera module and an image signal processor (ISP) to transmit multimedia data from the camera module to the ISP for further processing. The ISP may be part of an application processor. When a camera sensor with a higher resolution is employed in the camera module, the multimedia data transmitted over the camera interface would have a larger data size/data rate, which increases the power consumption of the camera interface inevitably. Similarly, if the camera module and the ISP are both located at a portable device (e.g., a smartphone) powered by a battery device, the battery life is shortened due to the increased power consumption of the camera interface.

Data compression may be employed to reduce the data size/data rate of data transmitted over a transmission interface, such as the display interface or the camera interface. In a conventional design, the pixel data used for block prediction may be stored in different line buffers with different line buffer bit depth settings, which results in a higher production cost. Thus, there is a need for an innovative design which can achieve the desired data compression/decompression through using pixel data in a shared data buffer, thereby reducing the hardware cost.

SUMMARY

In accordance with exemplary embodiments of the present invention, a method and apparatus for performing block prediction search based on restored sample values derived from stored sample values in a data buffer are proposed.

According to a first aspect of the present invention, an exemplary block prediction search method is disclosed. The exemplary block prediction search method includes: utilizing a data buffer to store bit-depth reduced sample values of a plurality of samples in a first pixel line; detecting occurrence of an edge in the first pixel line according to restored sample values derived from stored sample values in the data buffer; and determining a block prediction vector for a pixel group in a second pixel line different from the first pixel line, wherein the block prediction vector is determined based at least partly on a last edge count value indicative of a number of samples in the first pixel line that have gone by since the edge occurs.

According to a second aspect of the present invention, an exemplary block prediction search method is disclosed. The exemplary block prediction search method includes: utilizing a data buffer to store sample values corresponding to a plurality of samples in a first pixel line; computing a last edge count value according to sample values derived from stored sample values, each having a first bit depth in the data buffer, wherein the last edge count value is indicative of a number of samples in the first pixel line that have gone by since an edge occurs; computing sample difference information according to sample values derived from stored sample values, each having the first bit depth in the data buffer; and determining a block prediction vector for a pixel group in a second pixel line different from the first pixel line, wherein the block prediction vector is determined based at least partly on the last edge count value and the sample difference information.

According to a third aspect of the present invention, an exemplary block prediction search method is disclosed. The exemplary block prediction search method includes: utilizing a data buffer to store bit-depth reduced sample values of a plurality of samples in a first pixel line; and determining a block prediction vector for a pixel group in a second pixel line different from the first pixel line, wherein data of the first pixel line that are used in computation of the block prediction vector are all obtained from restored sample values derived from stored sample values in the data buffer.

According to a fourth aspect of the present invention, an exemplary image processing apparatus is disclosed. The exemplary image processing apparatus includes a data buffer and a block prediction search circuit. The data buffer is configured to store bit-depth reduced sample values of a plurality of samples in a first pixel line. The block prediction search circuit includes a first processing circuit and a second processing circuit. The first processing circuit is configured to detect occurrence of an edge in the first pixel line according to restored sample values derived from stored sample values in the data buffer, and compute a last edge count value indicative of a number of samples in the first pixel line that have gone by since the edge occurs. The second processing circuit is configured to determine a block prediction vector for a pixel group in a second pixel line different from the first pixel line, wherein the block prediction vector is determined based at least partly on the last edge count value.

According to a fifth aspect of the present invention, an exemplary image processing apparatus is disclosed. The exemplary image processing apparatus includes a data buffer and a block prediction search circuit. The data buffer is configured to store sample values corresponding to a plurality of samples in a first pixel line. The block prediction search circuit includes a first processing circuit and a second processing circuit. The first processing circuit is configured to compute a last edge count value according to sample values derived from stored sample values, each having a first bit depth in the data buffer, wherein the last edge count value is indicative of a number of samples in the first pixel line that have gone by since an edge occurs. The second processing circuit is configured to compute sample difference information according to sample values derived from stored sample values, each having the first bit depth in the data buffer; and determine a block prediction vector for a pixel group in a second pixel line different from the first pixel line, wherein the block prediction vector is determined based at least partly on the last edge count value and the sample difference information.

According to a sixth aspect of the present invention, an exemplary image processing apparatus is disclosed. The exemplary block prediction search apparatus includes a data buffer and a block prediction search circuit. The data buffer is configured to store bit-depth reduced sample values of a plurality of samples in a first pixel line. The block prediction search circuit is configured to determine a block prediction vector for a pixel group in a second pixel line different from the first pixel line, wherein data of the first pixel line that are used in computation of the block prediction vector are all obtained from restored sample values derived from stored sample values in the data buffer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
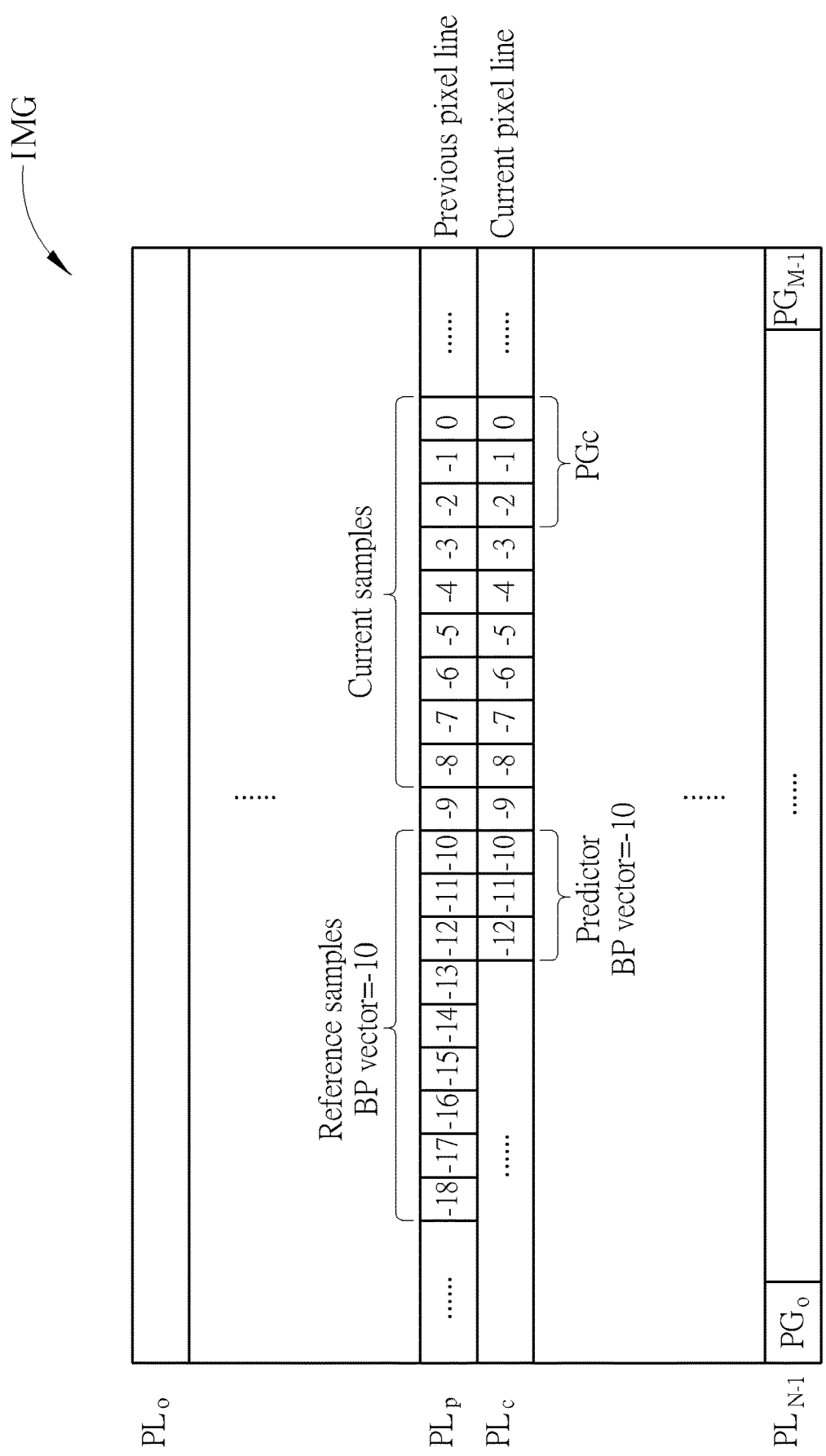
FIG. 1 is a diagram illustrating a block prediction used in either of a proposed compressor and a proposed decompressor of the present invention for computing final vector information of a pixel group currently being encoded/decoded.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One concept of the present invention is to use a buffer device which stores bit-depth reduced sample values used for computing edge information (e.g., a position of an edge and an associated last edge count value) needed to determine a block prediction search vector. For example, the proposed block prediction search method may be adopted in a Video Electronics Standards Association (VESA) display stream compression (DSC). Specifically, the present invention proposes computing a last edge count value and SAD (sum of absolute difference) values based on restored sample values derived from stored sample values in the same data buffer, rather than the reconstructed/decoded sample values. Since the last edge count computation and the SAD computation share the same data buffer, the compressor/decompressor does not need extra storage for storing data needed by the last edge count computation. Further details of the proposed block prediction search design are described as below.

For better understanding of technical features of the present invention, the block prediction (BP) is briefly described with reference to FIG. 1, which is a diagram illustrating a block prediction used in either of a proposed compressor and a proposed decompressor of the present invention for computing final vector information of a pixel group currently being encoded/decoded. One image IMG is composed of a plurality of pixel lines $PL_0$-$PL_{N-1}$, each of the pixel lines $PL_0$-$PL_{N-1}$ is composed of a plurality of pixel groups $PG_0$-$PG_{M-1}$, each of the pixel groups $PG_0$-$PG_{M-1}$ is composed of a plurality of pixels (e.g., 3 pixels), and each pixel is composed of at least one color channel sample. The values of M and N may be any positive integers, depending upon the image resolution of the image IMG. The block prediction is used to predict a current sample (e.g., a current pixel) from a previous reconstructed sample in the same pixel line (e.g., a left reconstructed pixel in the same pixel line). The previous reconstructed sample is a BP predictor found using the BP search process, where an offset from the current sample to the BP predictor is called a BP vector. More specifically, the BP vector and the decision of whether or not to use the block prediction are determined automatically by the block prediction function, which is the same in both of an encoder side and a decoder side. It should be noted that the BP vector and decision applies to a pixel group composed of multiple pixels (e.g., 3 pixels in a group).

The BP search to find the best BP vector for a current pixel group (e.g., $PG_C$) in a current pixel line (e.g., $PL_C$) is performed based on a previous pixel line (e.g., $PL_P$) rather than the current pixel line. Since the previous pixel line is encoded/decoded earlier than the current pixel line, a reconstructed/decoded pixel line is therefore used by the BP search. It should be noted that block prediction is not allowed on the upper-most pixel line $PL_0$ because the previous pixel line (i.e., an upper pixel line) is not available. The BP search compares a set of 9 consecutive current samples with sets of nine consecutive reference samples. And a set of reference samples corresponds to a block prediction vector with the range from −3 to −10. For each vector considered, a SAD (sum of absolute differences) value is calculated over 9 samples in each of the current set and reference set. The vector with the lowest SAD value is selected. In cases of ties, the vector closest to the offset {0} is selected. As shown in FIG. 1, the lowest SAD block prediction vector may be −10. When the block prediction is enabled and the lowest SAD block prediction vector is determined to be the final BP vector, the current pixel group $PG_C$ may be encoded/decoded with a reconstructed/decoded pixel group in the current pixel line that is pointed to by the BP vector −10 (i.e., reconstructed/decoded samples in the current pixel line that are indexed by offsets {−10, −11, −12}).

It should be noted that the lowest SAD block prediction vector found using the BP search is a candidate BP vector, and several criteria may be checked to determine whether or not the candidate BP vector can become the final BP vector. For example, the 9-pixel SAD value of the vector −1 is also calculated in order to determine whether BP or MMAP (Modified Medium Adaptive Prediction) should be used. In addition, the parameters checked in the criteria may include the position of current vector-processing group (hPos), the block prediction count (bpCount), the number of pixels that have gone by since an "edge" occurred (lastEdgeCount), and the number of pixels in current vector-processing group.

In this embodiment, the edge-related information (e.g., the last edge count value) involved in determining the block prediction vector is computed based on restored sample values derived from stored sample values in the same data buffer. In one exemplary design, at least the sample difference information (i.e., SAD values) and the edge-related information (e.g., the last edge count value) required for determining the block prediction vector is computed based on restored sample values derived from stored sample values in the same data buffer. In another exemplary design, the previous pixel line data that are actually used in computation of the block prediction vector are all obtained from restored sample values derived from stored sample values in the data buffer. Further details are described as below.

Figure 2:
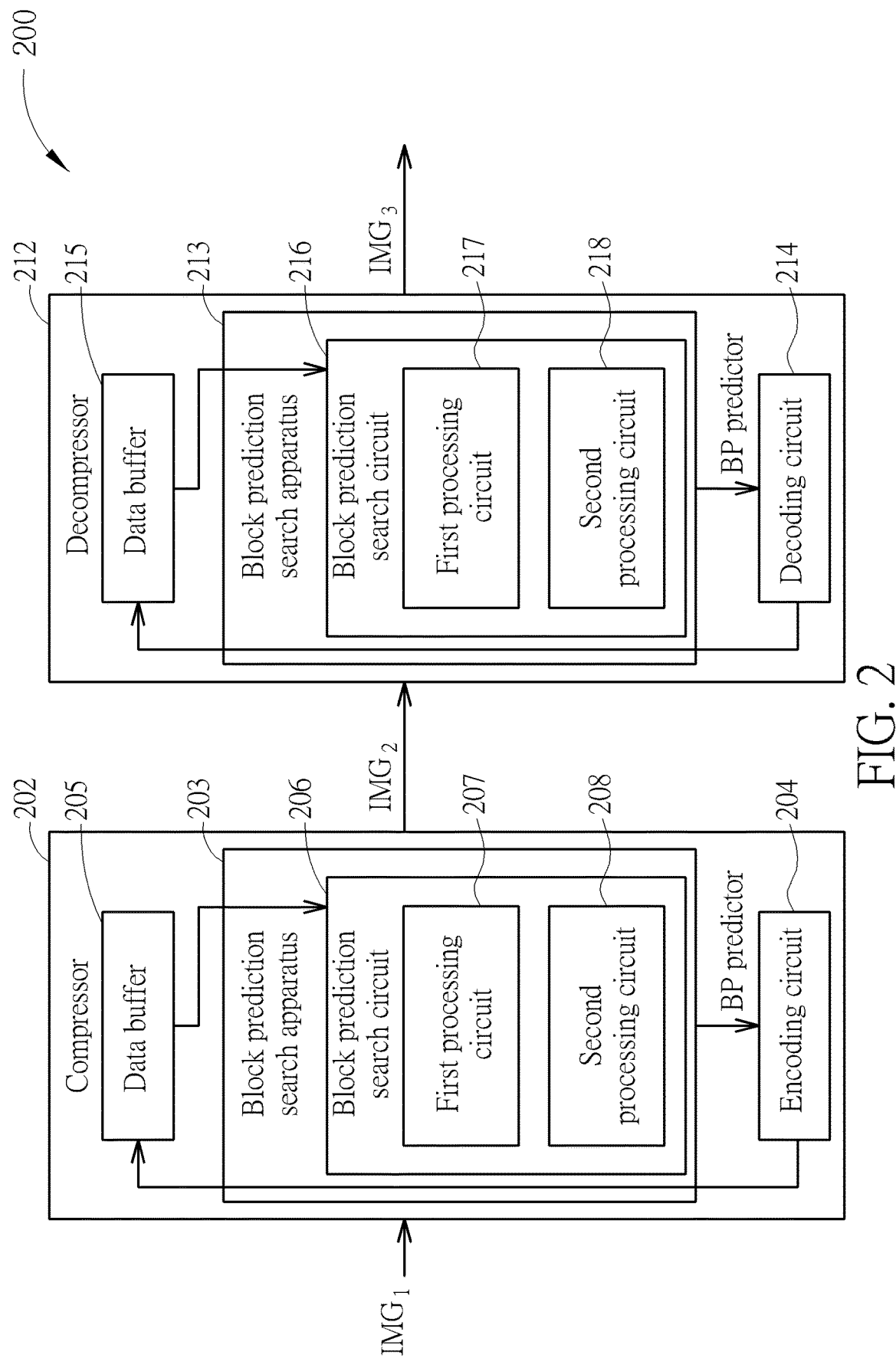
FIG. 2 is a diagram illustrating an exemplary data processing system according to an embodiment of the present invention.

FIG. 2 is a diagram illustrating a data processing system according to an embodiment of the present invention. The data processing system 200 includes a plurality of image processing apparatuses, such as a compressor 202 and a decompressor 212, each supporting the proposed block prediction method. By way of example, but not limitation, the proposed block prediction method may be employed in a Video Electronics Standards Association (VESA) display stream compression (DSC). The compressor 202 with block prediction is located at an encoder side, and includes a block prediction search apparatus 203, an encoding circuit 204 and a data buffer 205. The block prediction search apparatus 203 includes a block prediction search circuit 206 coupled to the data buffer 205 and the encoding circuit 204, where the block prediction search circuit 206 includes at least a first processing circuit 207 and a second processing circuit 208. The decompressor 212 with block prediction is located at a decoder side, and includes a block prediction search apparatus 213, a decoding circuit 214 and a data buffer 215. The block prediction search apparatus 213 includes a block prediction search circuit 216 coupled to the data buffer 215 and the decoding circuit 214, where the block prediction search circuit 216 includes at least a first processing circuit 217 and a second processing circuit 218. It should be noted that only the circuit components pertinent to the present invention are shown in FIG. 2. In practice, each of compressor 202 and decompressor 212 may include additional circuit components, depending upon actual design consideration. As shown in FIG. 2, the compressor 202 is configured to compress an input image (e.g., an uncompressed image) $IMG_1$ to generate a compressed image $IMG_2$, and the decompressor 212 is configured to decompress the compressed image $IMG_2$ to generate a decompressed image $IMG_3$.

Supposing that the image IMG shown in FIG. 1 is the input image $IMG_1$ to be compressed by the compressor 202 shown in FIG. 2, the input image $IMG_1$ is composed of pixel lines $PL_0$-$PL_{N-1}$, each of the pixel lines $PL_0$-$PL_{N-1}$ is composed of pixel groups $PG_0$-$PG_{M-1}$, each of the pixel groups $PG_0$-$PG_{M-1}$ is composed of multiple pixels (e.g., 3 pixels), and each pixel is composed of at least one color channel sample. In this embodiment, the buffer bit depth of the data buffer 205 is smaller than the maximum bit depth of a color channel. Hence, the sample value of the color channel is clamped according to a sampling method. Concerning a reconstructed pixel line generated from a reconstruction loop of the encoding circuit 204, the encoding circuit 204 performs the sampling method upon a reconstructed sample value of the color channel to generate a corresponding bit-depth reduced sample value to the data buffer 205. However, this is for illustrative purposes only, and is not meant to be a limitation of the present invention. One concept of the present invention is to reduce the hardware cost by obtaining any previous pixel line data needed in computation of a block prediction vector from restored sample values derived from stored sample values in the same data buffer. Hence, the implementation of the sampling method at the encoder side is not limited in the encoding circuit 204. For another exemplary design, the implementation of the sampling method at the encoder size can be in data buffer 205.

By way of example, the following sampling method may be used by the encoding circuit 204.

$$\text{shift\_amount} = \text{MAX}(\text{max}Bpc - \text{linebuf\_depth}, 0) \quad (1)$$

$$\text{round} = (\text{shift\_amount} > 0)?1 << (\text{shift\_amount} - 1): \text{round} = 0 \quad (2)$$

$$\text{storedSample} = \text{MIN}(((\text{inSample} + \text{round}) >> \text{shift\_amount}), (1 << \text{linebuf\_depth}) - 1) \quad (3)$$

In above formulas, MAX( ) is a function which selects a maximum value, MIN( ) is a function which selects a minimum value, maxBpc represents the bit depth of the color channel, linebuf_depth represents the line buffer bit depth of a line buffer (e.g., data buffer 205), inSample represented the reconstructed sample value, storedSample represents the stored sample value, round represents a rounding value. Specifically, the aforementioned formula (1) is used to compute the number of bit positions for a right-shifting operation ">>"; the aforementioned formula (2) is used to compute the rounding value; and the aforementioned formula (3) is used to compute the bit-depth reduced sample value. Since the data buffer 205 stores sample values each having a reduced bit depth constrained by a line buffer bit depth setting, the buffer size of the data buffer 205 can be reduced, thus saving the production cost.

In this embodiment, the data buffer 205 is coupled to the encoding circuit 204, and used to store bit-depth reduced sample values of a plurality of samples in a first pixel line (e.g., previous pixel line $PL_P$). For example, after the encoding circuit 208 finishes encoding the previous pixel line $PL_P$, reconstructed sample values of pixels in a reconstructed pixel line involved in encoding the previous pixel line $PL_P$ are stored into the data buffer 205 for further use.

The block prediction search circuit 206 is coupled to the data buffer 205, and used to perform block prediction search to determine a block prediction vector for a pixel group in a second pixel line (e.g., current pixel group $PG_C$ in current pixel line $PL_C$), where the second pixel line is different from (e.g., below) the first pixel line. In this embodiment, the block prediction search circuit 206 determines a block prediction vector for a pixel group in the second pixel line based on restored sample values derived from stored sample values in the data buffer 205, wherein the restored sample values and the stored sample values correspond to samples in the first pixel line, and a bit depth of each of the restored samples is not smaller than (i.e., equal to or larger than) a bit depth of each of the stored samples. For example, the block prediction search circuit 206 may obtain the restored sample values by using the following left-shifting operation.

$$\text{readSample} = \text{storedSample} << \text{shift\_amount} \quad (4)$$

In above formula (4), readSample represents the restored sample value.

For another example, the block prediction search circuit 206 may obtain the restored sample values by using the following read-out operation.

$$readSample = storedSample \quad (5)$$

The first processing circuit 207 is configured to detect occurrence of an edge in the first pixel line according to restored sample values derived from stored sample values in the data buffer 205, and compute a last edge count value which is indicative of the number of samples in the first pixel line that have gone by since the edge occurred. For example, the occurrence of an "edge" is detected by the first processing circuit 207 when ABS(current sample−left sample) >32<<(bits_per_component−8) is met, where ABS( ) is a function which outputs an absolute value, and bits_per_component is a color component bit depth specified in a PPS (picture parameter set). Based on the location of the edge found in the first pixel line, the last edge count value for a pixel group in the second pixel line can be determined. For example, when the first processing circuit 207 detects an edge located at a pixel position indexed by the offset {−4}, the last edge count value for the current pixel group $PG_C$ to be encoded is obtained from a distance between a pixel position indexed by the offset {−4} and a pixel position of the current pixel group $PG_C$.

The second processing circuit 208 is configured to compute sample difference information (e.g., SAD values) according to restored sample values derived from stored sample values in the data buffer 205, and determine a block prediction vector for a pixel group in the second pixel line based at least partly on the last edge count value and the sample difference information. As mentioned above, the sample difference information may be used to find the lowest SAD block prediction vector as a candidate BP vector. Next, several criteria are checked by the second processing circuit 208 to determine whether or not the candidate BP vector can become the final BP vector. In one exemplary design, the parameters checked in the criteria may include the last edge count value. Hence, at least the sample difference information and the last edge count value used for determining the block prediction vector are determined based on restored sample values derived from stored sample values (i.e., bit-depth reduced sample values) in the same data buffer 205. In another exemplary design, all of the parameters checked in the criteria may be determined based on restored sample values derived from stored sample values (i.e., bit-depth reduced sample values) in the same data buffer 205. For example, all of the parameters checked in the criteria may include the position of current vector-processing group, the block prediction count, the number of pixels that have gone by since an edge occurred, and the number of pixels in current vector-processing group. In other words, the block prediction search circuit 206 may determine a block prediction vector for a pixel group in the second pixel line based on restored sample values of the samples in the first pixel line, rather than the reconstructed sample values of the samples in the first pixel line. Specifically, the previous pixel line data (e.g., data of the first pixel line) that are actually used in computation of the block prediction vector are all obtained from restored sample values derived from stored sample values in the data buffer 205.

Figure 3:
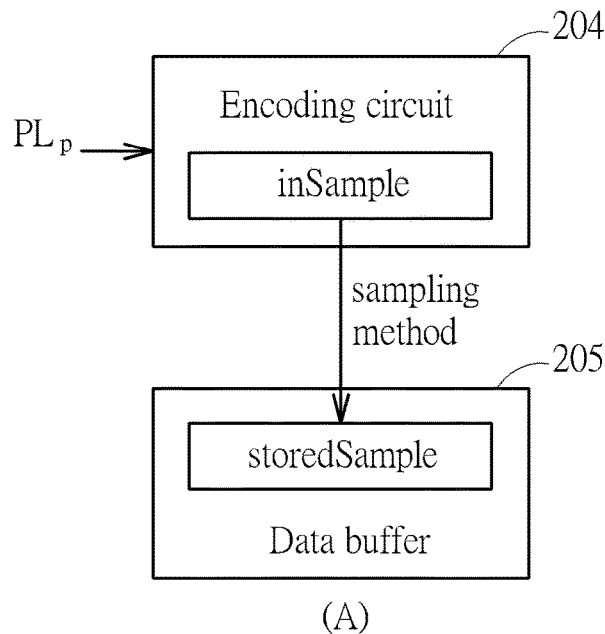
FIG. 3 is a diagram illustrating an exemplary compression operation performed by a compression shown in FIG. 2 according to an embodiment of the present invention.
Figure 3:
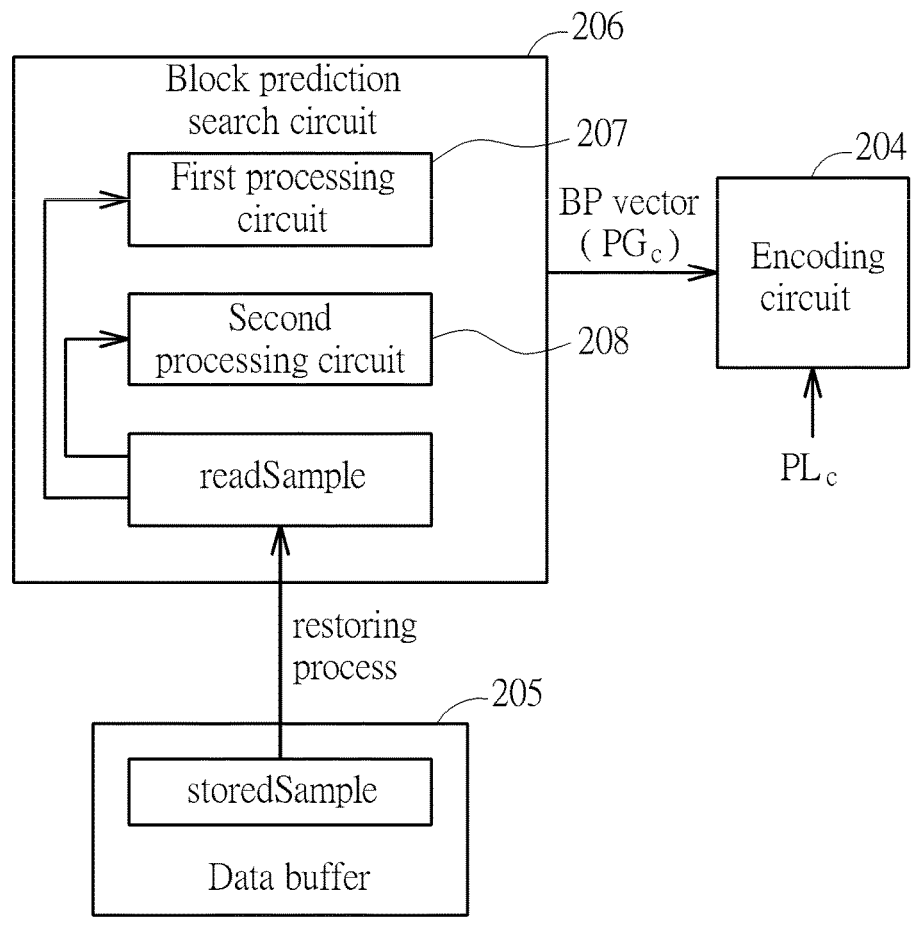

FIG. 3 is a diagram illustrating an exemplary compression operation performed by the compression 202 shown in FIG. 2 according to an embodiment of the present invention. The sub-diagram (A) of FIG. 3 shows a first phase of encoding the current pixel group $PG_C$. The encoding circuit 204 encodes pixel groups $PG_0$-$PG_{M-1}$ in the previous pixel line $PL_P$, and obtains reconstructed sample values inSample of samples in the previous pixel line $PL_P$. In this example, the encoding circuit 204 performs a sampling method (e.g., aforementioned formulas (1)-(3)) to generate bit-depth reduced sample values of the samples in the previous pixel line $PL_P$ to the data buffer 205, such that each of the stored sample values storedSample in the data buffer 205 has a bit depth smaller than that possessed by each of the reconstructed sample values inSample.

The sub-diagram (B) of FIG. 3 shows a second phase of encoding the current pixel group $PG_C$. The block prediction search circuit 206 performs a restoring process (e.g., aforementioned formula (4) or formula (5)) upon the stored sample values storedSample in the data buffer 205 to obtain restored sample values readSample of the samples in the previous pixel line $PL_P$. By way of example, but not limitation, each of the restored sample values readSample has a bit depth larger than that possessed by each of the stored sample values storedSample, and each of the restored sample values readSample may have a bit depth equal to that possessed by each of the reconstructed sample values inSample. The first processing circuit 207 refers to needed restored sample values readSample to compute edge-related information (e.g., a position of an edge and an associated last edge count value). The second processing circuit 208 refers to needed restored sample values readSample to compute sample difference information (e.g., SAD values). In addition, the second processing circuit 208 computes a block prediction vector for the current pixel group $PG_C$ in the current pixel line $PL_C$ according to at least the last edge count value and the SAD values, and outputs the block prediction vector to the encoding circuit 204. Next, the encoding circuit 204 refers to the block prediction vector to encode the current pixel group $PG_C$ in the current pixel line $PL_C$.

A block prediction vector used for encoding each pixel group is not signaled in a bitstream transmitted from a transmitting end having the compressor 202 to a receiving end having the decompressor 212. Hence, the same block prediction search method performed by the block prediction search apparatus 203 of the compressor 202 is also performed by the block prediction search apparatus 213 of the decompressor 212.

Please refer to FIG. 2 again. Supposing that the image IMG shown in FIG. 1 is the compressed image $IMG_2$ to be decompressed by the decompressor 212 shown in FIG. 2, the compressed image $IMG_2$ is composed of pixel lines $PL_0$-$PL_{N-1}$, each of the pixel lines $PL_0$-$PL_{N-1}$ is composed of pixel groups $PG_0$-$PG_{M-1}$, each of the pixel groups $PG_0$-$PG_{M-1}$ is composed of multiple pixels (e.g., 3 pixels), and each pixel is composed of at least one color channel sample. In this embodiment, the buffer bit depth of the data buffer 215 is smaller than the maximum bit depth of a color channel. Hence, the sample value of the color channel is clamped according to a sampling method. Concerning a decoded pixel line generated from the decoding circuit 214, the decoding circuit 214 performs the sampling method upon the decoded sample value of the color channel to generate a corresponding bit-depth reduced sample value to the data buffer 215. However, this is for illustrative purposes only, and is not meant to be a limitation of the present invention. One concept of the present invention is to reduce the hardware cost by obtaining any previous pixel line data needed in computation of a block prediction vector from restored sample values derived from stored sample values in the same data buffer. Hence, the implementation of the sampling method at the decoder side is not limited in the decoding circuit 214. For another exemplary design, the implementation of the sampling method at the decoder size can be in data buffer 215.

By way of example, the sampling method may be performed by the decoding circuit 214, and may be implemented using the aforementioned formulas (1)-(3) used by the encoding circuit 204. Similarly, since the data buffer 215 stores sample values each having a reduced bit depth constrained by a line buffer bit depth setting, the buffer size of the data buffer 215 can be reduced, thus saving the production cost.

In this embodiment, the data buffer 215 is coupled to the decoding circuit 214, and used to store bit-depth reduced sample values of a plurality of samples in a first pixel line (e.g., previous pixel line $PL_P$). For example, after the decoding circuit 218 finishes decoding the previous pixel line $PL_P$, decoded sample values of pixels in a decoded pixel line (i.e., a decoding result of the previous pixel line $PL_P$) are stored into the data buffer 215 for further use.

The block prediction search circuit 216 is coupled to the data buffer 215, and used to perform block prediction search to determine a block prediction vector for a pixel group in a second pixel line (e.g., current pixel group $PG_C$ in the current pixel line $PL_C$), where the second pixel line is different from (e.g., below) the first pixel line. In this embodiment, the block prediction search circuit 216 determines a block prediction vector for a pixel group in the second pixel line based on restored sample values derived from stored sample values in the data buffer 215, wherein the restored sample values and the stored sample values correspond to samples in the first pixel line, and a bit depth of each of the restored samples is not smaller than (i.e., larger than or equal to) a bit depth of each of the stored samples. For example, the block prediction search circuit 216 may obtain the restored sample values by using a left-shifting operation such as the aforementioned formula (4) used by the block prediction search circuit 206, or by using a read-out operation such as the aforementioned formula (5) used by the block prediction search circuit 206.

The first processing circuit 217 is configured to detect occurrence of an edge in the first pixel line according to restored sample values derived from stored sample values in the data buffer 215, and compute a last edge count value which is indicative of the number of samples in the first pixel line that have gone by since the edge occurred. For example, the occurrence of an "edge" is detected by the first processing circuit 217 when ABS (current sample−left sample) >32<<(bits_per_component−8) is met. Based on the location of the edge found in the first pixel line, the last edge count value for a pixel group in the second pixel line can be determined. For example, when the first processing circuit 217 detects an edge located at a pixel position indexed by the offset {−4}, the last edge count value for the current pixel group $PG_C$ to be decoded is obtained from a distance between a pixel position indexed by the offset {−4} and a pixel position of the current pixel group $PG_C$.

The second processing circuit 218 is configured to compute sample difference information (e.g., SAD values) according to restored sample values derived from stored sample values, and determine a block prediction vector for a pixel group in the second pixel line based at least partly on the last edge count value and the sample difference information. As mentioned above, the sample difference information may be used to find the lowest SAD block prediction vector as a candidate BP vector. Next, several criteria are checked by the second processing circuit 218 to determine whether or not the candidate BP vector can become the final BP vector. In one exemplary design, the parameters checked in the criteria may include the last edge count value (lastEdgeCount). Hence, at least the sample difference information and the last edge count value used for determining the block prediction vector are determined based on restored sample values derived from stored sample values (i.e., bit-depth reduced sample values) in the same data buffer 215. In another exemplary design, all of the parameters checked in the criteria may be determined based on restored sample values derived from stored sample values (i.e., bit-depth reduced sample values) in the same data buffer 215. For example, all of the parameters checked in the criteria may include the position of current vector-processing group, the block prediction count, the number of pixels that have gone by since an edge occurred, and the number of pixels in current vector-processing group. In other words, the block prediction search circuit 216 may determine a block prediction vector for a pixel group in the second pixel line based on restored sample values of the samples in the first pixel line, rather than the decoded sample values of the samples in the first pixel line. Specifically, the previous pixel line data (e.g., data of the first pixel line) that are actually used in computation of the block prediction vector are all obtained from restored sample values derived from stored sample values in the data buffer 215.

Figure 4:
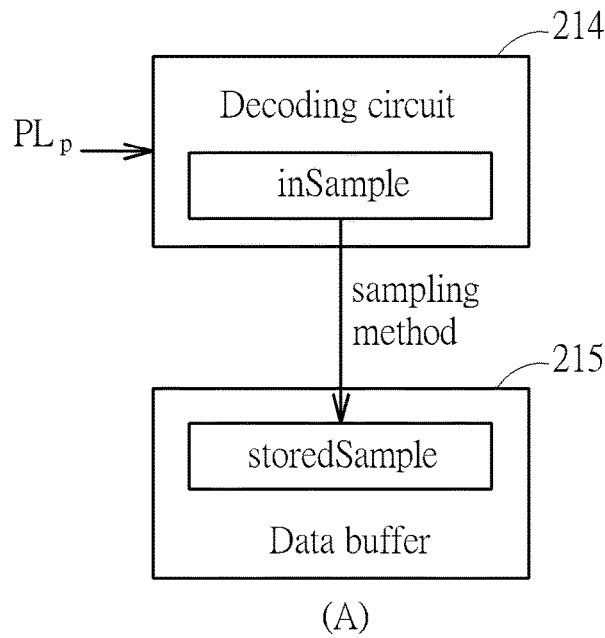
FIG. 4 is a diagram illustrating an exemplary decompression operation performed by a decompression shown in FIG. 2 according to an embodiment of the present invention.
Figure 4:
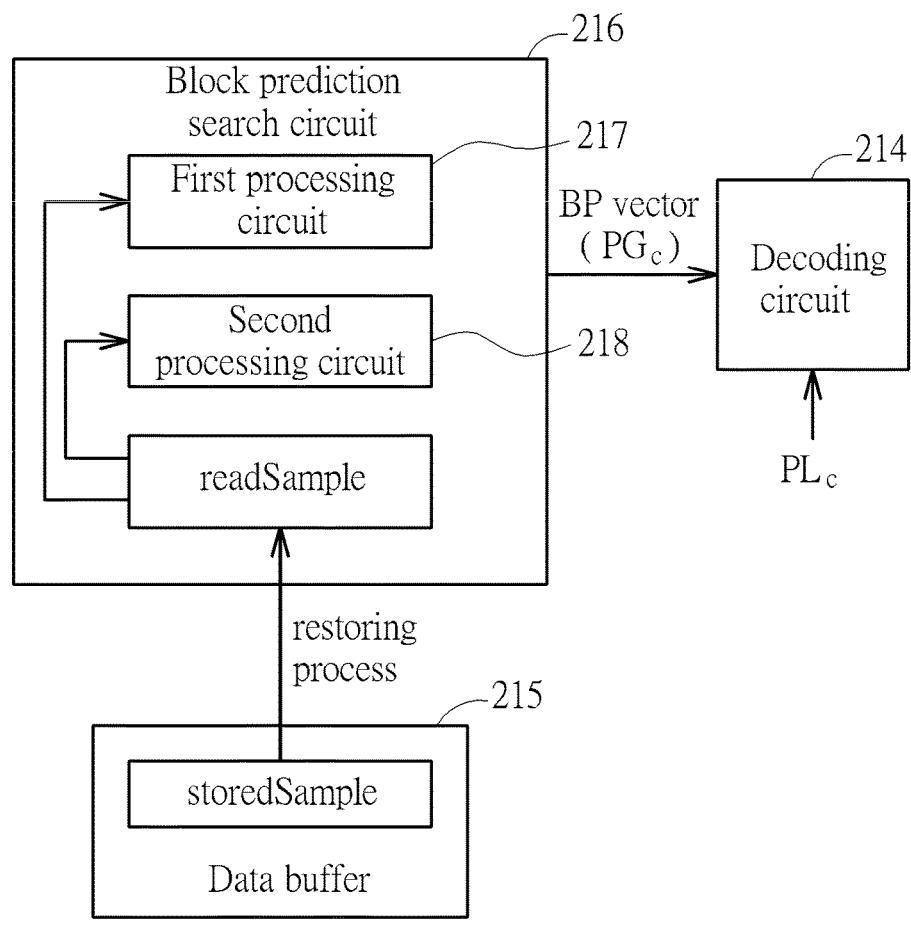

FIG. 4 is a diagram illustrating an exemplary decompression operation performed by the decompression 212 shown in FIG. 2 according to an embodiment of the present invention. The sub-diagram (A) of FIG. 4 shows a first phase of decoding the current pixel group $PG_C$. The decoding circuit 214 decodes pixel groups $PG_0$-$PG_{M-1}$ in the previous pixel line $PL_P$, and obtains decoded sample values inSample of samples in the previous pixel line $PL_P$. In this example, the decoding circuit 214 performs a sampling method (e.g., aforementioned formulas (1)-(3)) to generate bit-depth reduced sample values of the samples in the previous pixel line $PL_P$ to the data buffer 215, such that each of the stored sample values storedSample in the data buffer 215 has a bit depth smaller than that possessed by each of the decoded sample values inSample.

The sub-diagram (B) of FIG. 4 shows a second phase of decoding the current pixel group $PG_C$. The block prediction search circuit 216 performs a restoring process (e.g., aforementioned formula (4) or formula (5)) upon the stored sample values storedSample in the data buffer 215 to obtain restored sample values readSample of the samples in the previous pixel line $PL_P$. By way of example, but not limitation, each of the restored sample values readSample has a bit depth larger than that possessed by each of the stored sample values storedSample, and each of the restored sample values readSample may have a bit depth equal to that possessed by each of the decoded sample values inSample. The first processing circuit 217 refers to needed restored sample values readSample to compute edge-related information (e.g., a position of an edge and an associated last edge count value). The second processing circuit 218 refers to needed restored sample values readSample to compute sample difference information (e.g., SAD values). In addition, the second processing circuit 218 computes a block prediction vector for the current pixel group $PG_C$ in the current pixel line $PL_C$ according to at least the last edge count value and the SAD values, and outputs the block prediction vector to the decoding circuit 214. Next, the decoding circuit 214 refers to the block prediction vector to decode the current pixel group $PG_C$ in the current pixel line $PL_C$.

As mentioned above, the compressor 202 is configured to compress the input image IMG₁ to generate the compressed image IMG₂, and the decompressor 212 is configured to decompress the compressed image IMG₂ to generate the decompressed image IMG₃. Hence, compressed data transmission between the compressor 202 and the decompressor 212 can be realized. In a first exemplary application, the compressor 202 may be part of an application processor (AP), and the decompressor 212 may be part of a driver integrated circuit (IC). Hence, the compressed image IMG₂ may be transmitted from the AP to the driver IC via a display interface. For example, the display interface is a display serial interface (DSI) standardized by a Mobile Industry Processor Interface (MIPI) or an embedded display port (eDP) standardized by VESA. In a second exemplary application, the compressor 202 may be part of a camera module, and the decompressor 212 may be part of an AP. Hence, the compressed image IMG₂ may be transmitted from the camera module to the AP via a camera interface. For example, the camera interface is a camera serial interface (CSI) standardized by MIPI. In a third exemplary application, the compressor 202 and the decompressor 212 may be implemented in the same AP. Hence, the compressed image IMG₂ may be transmitted from the compressor 202 to the decompressor 212 via a bus of the AP. For example, the compressor 202 may be part of a video decoder in the AP, and the decompressor 212 may be part of a memory device in the AP. For another example, the compressor 202 may be part of an image signal processor (ISP) in the AP, and the decompressor 212 may be part of a graphics processing unit (GPU) in the AP. Ina fourth exemplary application, the compressor 202 and the decompressor 212 may be implemented in the same driver IC. Hence, the compressed image IMG₂ may be transmitted from the compressor 202 to the decompressor 212 via a bus of the drive IC. In a fifth exemplary application, the compressor 202 and the decompressor 212 may be implemented in the same camera module. Hence, the compressed image IMG₂ may be transmitted from the compressor 202 to the decompressor 212 via a bus of the camera module.

It should be noted that the present invention has no limitation on the pixel data format of each pixel included in the input image IMG₁ to be encoded by the compressor 202 and the compressed image IMG₂ to be decoded by the decompressor 212. For example, the pixel data format of each pixel may be an RGB/YUV 4:4:4 color format, an RGB/YUV 4:2:2 color format, or an RGB/YUV 4:2:0 color format. When the image is generated from a camera sensor employing a BGGR Bayer pattern color filter array (CFA), each pixel may include one blue color component (B) and one green color component (G), or one red color component (R) and one green color component (G), or one blur color component (B), two green color components (G) and one red color component (R).

The block prediction method proposed by the present invention function can be employed by VESA DSC. However, this is for illustrative purposes only, and is not meant to be a limitation of the present invention. Actually, the proposed compression design and decompression design may be applied to an application using any image compression algorithm with block prediction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A block prediction search method, comprising:
encoding or decoding a first pixel line to generate sample values of a plurality of samples in the first pixel line;
generating a bit-depth reduced sample value by sampling each of the sample values of the samples in the first pixel line according to a difference between a bit depth of said each of the sample values and a buffer bit depth of a data buffer, wherein the bit depth of said each of the sample values is larger than the buffer bit depth of the data buffer, and a bit depth of the bit-depth reduced sample value is smaller than the bit depth of said each of the sample values;
storing bit-depth reduced sample values of the samples in the first pixel line into the data buffer;
obtaining restored sample values by reading the data buffer, wherein the restored sample values are derived from stored bit-depth reduced sample values in the data buffer, and a bit depth of each of the restored sample values is not smaller than a bit depth of each of the stored bit-depth reduced sample values;
detecting occurrence of an edge in the first pixel line according to the restored sample values;
determining a block prediction vector of a pixel group in a second pixel line different from the first pixel line based at least partly on a last edge count value indicative of a number of samples in the first pixel line that have gone by since the edge occurs, wherein determining the block prediction vector of the pixel group in the second pixel line comprises:
generating a comparison result by comparing a first set of N consecutive samples in the first pixel line with each of second sets of N consecutive samples in the first pixel line, wherein N is a positive integer, a rightmost sample of the first set of N consecutive sample in the first pixel line and a rightmost sample of the pixel group in the second pixel line have a same column position in an image, and rightmost samples of the first set of N consecutive samples and the second sets of N consecutive samples are different samples in the first pixel line;
referring to the comparison result to select one of the second sets of N consecutive samples;
utilizing a position offset between the rightmost sample of the first set of N consecutive sample and a rightmost sample of said one of the second sets of N consecutive samples as the block prediction vector of the pixel group; and
checking at least the last edge count value to determine whether or not the block prediction vector is selected as a final block prediction vector of the pixel group in the second pixel line; and
when the block prediction vector is the final block prediction vector of the pixel group in the second pixel line, encoding or decoding the pixel group in the second pixel line according to the final block prediction vector.

2. The block prediction search method of claim 1, wherein the samples in the first pixel line are reconstructed pixels of the first pixel line.

3. The block prediction search method of claim 1, wherein the samples in the first pixel line are decoded pixels of the first pixel line.

4. The block prediction search method of claim 1, wherein the block prediction search method is performed on both of a compressor and a decompressor.

5. A block prediction search method, comprising:
encoding or decoding a first pixel line to generate sample values of a plurality of samples in the first pixel line;
storing first sample values derived from the sample values of the samples in the first pixel line into a data buffer;
obtaining second sample values by reading the data buffer, wherein the second sample values are derived from stored first sample values, each having a first bit depth in the data buffer;
computing a last edge count value according to the second sample values wherein the last edge count value is indicative of a number of samples in the first pixel line that have gone by since an edge occurs;
obtaining third sample values by reading the data buffer, wherein the third sample values are derived from stored first sample values, each having the first bit depth in the data buffer;
computing sample difference information according to the third sample values that correspond to a first set of N consecutive samples in the first pixel line and second sets of N consecutive samples in the first pixel line wherein N is a positive integer, the sample difference information comprises sample difference values each generated by comparinq the first set of N consecutive samples with one of the second sets of N consecutive samples, a rightmost sample of the first set of N consecutive sample in the first pixel line and a rightmost sample of a pixel group in a second pixel line have a same column position in an image, and rightmost samples of the first set of N consecutive samples and the second sets of N consecutive samples are different samples in the first pixel line; and
determining a block prediction vector of the pixel group in the second pixel line different from the first pixel line, comprising:
selecting one of the second sets of N consecutive samples according to the sample difference values that are generated by comparing the first set of N consecutive samples and the second sets of N consecutive samples;
utilizing a position offset between the rightmost sample of the first set of N consecutive sample and a rightmost sample of said one of the second sets of N consecutive samples as the block prediction vector of the pixel group; and
checking at least the last edge count value to determine whether or not the block prediction vector is selected as a final block prediction vector of the pixel group in the second pixel line; and
when the block prediction vector is the final block prediction vector of the pixel group in the second pixel line, encoding or decoding the pixel group in the second pixel line according to the final block prediction vector;
wherein the sample values stored in the data buffer are bit-depth reduced sample values of the samples in the first pixel line.

6. A block prediction search method, comprising:
encoding or decoding a first pixel line to generate sample values of a plurality of samples in the first pixel line;
generating a bit-depth reduced sample value by sampling each of the sample values of the samples in the first pixel line according to a difference between a bit depth of said each of the sample values and a buffer bit depth of a data buffer, wherein the bit depth of said each of the sample values is larger than the buffer bit depth of the data buffer, and a bit depth of the bit-depth reduced sample value is smaller than the bit depth of said each of the sample values;
storing bit-depth reduced sample values of the samples in the first pixel line into the data buffer;
obtaining restored sample values by reading the data buffer, wherein the restored sample values are derived from stored bit-depth reduced sample values in the data buffer, and a bit depth of each of the restored sample values is not smaller than a bit depth of each of the stored bit-depth reduced sample values;
determining a block prediction vector of a pixel group in a second pixel line different from the first pixel line according to data of the first pixel line that are used in computation of the block prediction vector and are all obtained from the restored sample values, wherein determining the block prediction vector of the pixel group in the second pixel line comprises:
generating a comparison result by comparing a first set of N consecutive samples in the first pixel line with each of second sets of N consecutive samples in the first pixel line, wherein N is a positive integer, a rightmost sample of the first set of N consecutive sample in the first pixel line and a rightmost sample of the pixel group in the second pixel line have a same column position in an image, and rightmost samples of the first set of N consecutive samples and the second sets of N consecutive samples are different samples in the first pixel line;
referring to the comparison result to select one of the second sets of N consecutive samples;
utilizing a position offset between the rightmost sample of the first set of N consecutive sample and a rightmost sample of said one of the second sets of N consecutive samples as the block prediction vector of the pixel group; and
determining if the block prediction vector is selected as a final block prediction vector of the pixel group in the second pixel line; and
when the block prediction vector is the final block prediction vector of the pixel group in the second pixel line, encoding or decoding the pixel group in the second pixel line according to the final block prediction vector.

7. The block prediction search method of claim 6, wherein the samples in the first pixel line are reconstructed pixels of the first pixel line.

8. The block prediction search method of claim 6, wherein the samples in the first pixel line are decoded pixels of the first pixel line.

9. An image processing apparatus, comprising:
a data buffer, storing bit-depth reduced sample values of a plurality of samples in a first pixel line;
a block prediction search circuit, comprising:
a first processing circuit, obtaining restored sample values by reading the data buffer, wherein the restored sample values are derived from stored bit-depth reduced sample values in the data buffer, and a bit depth of each of the restored sample values is not smaller than a bit depth of each of the stored bit-depth reduced sample values; detecting occurrence of an edge in the first pixel line according to the restored sample values; and computing a last edge count value indicative of a number of samples in the first pixel line that have gone by since the edge occurs; and
a second processing circuit, determining a block prediction vector of a pixel group in a second pixel line different from the first pixel line based at least partly on the last edge count value, wherein determining the block prediction vector of the pixel group in the second pixel line comprises:

generating a comparison result by comparing a first set of N consecutive samples in the first pixel line with each of second sets of N consecutive samples in the first pixel line, wherein N is a positive integer, a rightmost sample of the first set of N consecutive sample in the first pixel line and a rightmost sample of the pixel group in the second pixel line have a same column position in an image, and rightmost samples of the first set of N consecutive samples and the second sets of N consecutive samples are different samples in the first pixel line;

referring to the comparison result to select one of the second sets of N consecutive samples;

utilizing a position offset between the rightmost sample of the first set of N consecutive sample and a rightmost sample of said one of the second sets of N consecutive samples as the block prediction vector of the pixel group; and checking at least the last edge count value to determine whether or not the block prediction vector is selected as a final block prediction vector of the pixel group in the second pixel line; and a third processing circuit, encoding or decoding the first pixel line to generate sample values of the samples in the first pixel line; generating a bit-depth reduced sample value by sampling each of the sample values of the samples in the first pixel line according to a difference between a bit depth of said each of the sample values and a buffer bit depth of the data buffer, wherein the bit depth of said each of the sample values is larger than the buffer bit depth of the data buffer, and a bit depth of the bit-depth reduced sample value is smaller than the bit depth of said each of the sample values; storing the bit-depth reduced sample values into the data buffer; and further encoding or decoding the pixel group in the second pixel line according to the final block prediction vector when the block prediction vector is the final block prediction vector of the pixel group in the second pixel line.

10. The image processing apparatus of claim 9, wherein the samples in the first pixel line are reconstructed pixels of the first pixel line.

11. The image processing apparatus of claim 9, wherein the samples in the first pixel line are decoded pixels of the first pixel line.

12. The image processing apparatus of claim 9, wherein the block prediction search apparatus is part of each of a compressor and a decompressor.

13. An image processing apparatus, comprising:
a data buffer, storing first sample values derived from sample values of a plurality of samples in a first pixel line;
a block prediction search circuit, comprising:
a first processing circuit, obtaining second sample values by reading the data buffer, wherein the second sample values are derived from stored first sample values, each having a first bit depth in the data buffer: computing a last edge count value according to the second sample values wherein the last edge count value is indicative of a number of samples in the first pixel line that have gone by since an edge occurs; and
a second processing circuit, obtaining third sample values by reading the data buffer, wherein the third sample values are derived from stored first sample values, each having the first bit depth in the data buffer; computing sample difference information according to the third sample values that correspond to a first set of N consecutive samples in the first pixel line and second sets of N consecutive samples in the first pixel line wherein N is a positive integer, the sample difference information comprises sample difference values each generated by comparing the first set of N consecutive samples with one of the second sets of N consecutive samples, a rightmost sample of the first set of N consecutive sample in the first pixel line and a rightmost sample of a pixel group in a second pixel line have a same column position in an image, and rightmost samples of the first set of N consecutive samples and the second sets of N consecutive samples are different samples in the first pixel line; and determining a block prediction vector of the pixel group in the second pixel line different from the first pixel line, comprising:

selecting one of the second sets of N consecutive samples according to the sample difference values that are generated by comparing the first set of N consecutive samples and the second sets of N consecutive samples;

utilizing a position offset between the rightmost sample of the first set of N consecutive sample and a rightmost sample of said one of the second sets of N consecutive samples as the block prediction vector of the pixel group; and checking at least the last edge count value to determine whether or not the block prediction vector is selected as a final block prediction vector of the pixel group in the second pixel line; and third processing circuit, encoding or decoding the first pixel line to generate the sample values of the samples in the first pixel line; storing the first sample values into the data buffer; and further encoding or decoding the pixel group in the second pixel line according to the final block prediction vector when the block prediction vector is the final block prediction vector of the pixel group in the second pixel line;

wherein the sample values stored in the data buffer are bit-depth reduced sample values of the samples in the first pixel line.

14. An image processing apparatus, comprising:
a data buffer, storing bit-depth reduced sample values of a plurality of samples in a first pixel line;
a block prediction search circuit, obtaining restored sample values by reading the data buffer, wherein the restored sample values are derived from stored bit-depth reduced sample values in the data buffer, and a bit depth of each of the restored sample values is not smaller than a bit depth of each of the stored bit-depth reduced sample values; determining a block prediction vector of a pixel group in a second pixel line different from the first pixel line according to data of the first pixel line that are used in computation of the block prediction vector and are all obtained from the restored sample values, wherein determining the block prediction vector of the pixel group in the second pixel line comprises:

generating a comparison result by comparing a first set of N consecutive samples in the first pixel line with each of second sets of N consecutive samples in the first pixel line, wherein N is a positive integer, a rightmost sample of the first set of N consecutive sample in the first pixel line and a rightmost sample of the pixel group in the second pixel line have a same column position in an image, and rightmost samples of the first set of N consecutive samples and the second sets of N consecutive samples are different samples in the first pixel line;

referring to the comparison result to select one of the second sets of N consecutive samples;

utilizing a position offset between the rightmost sample of the first set of N consecutive sample and a rightmost sample of said one of the second sets of N consecutive samples as the block prediction vector of the pixel group; and determining if the block prediction vector is selected as a final block prediction vector of the pixel group in the second pixel line; and a processing circuit, encoding or decoding a first pixel line to generate sample values of the samples in the first pixel line; generating a bit-depth reduced sample value by sampling each of the sample values of the samples in the first pixel line according to a difference between a bit depth of said each of the sample values and a buffer bit depth of the data buffer, wherein the bit depth of said each of the sample values is larger than the buffer bit depth of the data buffer, and a bit depth of the bit-depth reduced sample value is smaller than the bit depth of said each of the sample values; storing the bit-depth reduced sample values into the data buffer; and further encoding or decoding the pixel group in the second pixel line according to the final block prediction vector when the block prediction vector is the final block prediction vector of the pixel group in the second pixel line.

15. The image processing apparatus of claim 14, wherein the samples in the first pixel line are reconstructed pixels of the first pixel line.

16. The image processing apparatus of claim 14, wherein the samples in the first pixel line are decoded pixels of the first pixel line.

* * * * *